United States Patent [19]

Taylor

[11] Patent Number: 4,863,685
[45] Date of Patent: Sep. 5, 1989

[54] CORROSION RESISTANT ZIRCONIUM ALLOYS

[75] Inventor: Dale F. Taylor, Schenectady, N.Y.

[73] Assignee: General Electric Company, Schenectady, N.Y.

[21] Appl. No.: 212,467

[22] Filed: Jun. 28, 1988

Related U.S. Application Data

[63] Continuation of Ser. No. 41,507, Apr. 23, 1987, abandoned.

[51] Int. Cl.$^4$ ............................................. C22C 16/00
[52] U.S. Cl. ..................................... 420/422; 148/421
[58] Field of Search .................... 420/422; 148/11.5 F, 148/12.7 B, 407, 421

[56] References Cited

U.S. PATENT DOCUMENTS

| | | | |
|---|---|---|---|
| 2,705,674 | 4/1955 | Chubb | 420/422 |
| 3,121,034 | 2/1964 | Anderko et al. | 148/11.5 |
| 4,065,328 | 12/1977 | Cheadle et al. | 148/12.7 B |
| 4,212,686 | 7/1980 | Lunde et al. | 148/11.5 |
| 4,452,648 | 6/1984 | Cheadle et al. | 148/11.5 |
| 4,649,023 | 3/1987 | Sabol et al. | 420/422 |

FOREIGN PATENT DOCUMENTS

| | | | |
|---|---|---|---|
| 854655 | 10/1970 | Canada . | |
| 859053 | 12/1970 | Canada | 420/422 |
| 136675 | 6/1986 | Japan . | |

OTHER PUBLICATIONS

Ibrahim et al., "Creep and Stress—Rupture of High Strength Zirconium Alloys", Canadian Metal. Quarterly, vol. 11, No. 1, 1972, pp. 273–283.

Ito et al., Study of Zirconium Alloys for Nuclear Reactor with High Strength at Elevated Temperatures, Trans. Nat. Res. Inst. Metals, 6, 173–177, (1964).

*Primary Examiner*—Robert McDowell
*Attorney, Agent, or Firm*—James E. McGinness; James C. Davis, Jr.; James Magee, Jr.

[57] ABSTRACT

Zirconium-based corrosion resistant alloys are provided primarily for use as a cladding material for fuel rods in a boiling water nuclear reactor, the alloy in one embodiment consisting essentially of about 0.5–2.0 percent by weight of tin, about 0.5–1.0 percent by weight of a solute, the solute being composed of a member selected from the group consisting of molybdenum, tellurium and mixtures thereof, or alternatively, the solute will contain niobium in combination with molybdenum and/or tellurium and the remainder being zirconium, and in another embodiment the alloy consists essentially of about 0.5–2.0 percent by weight of tin 0.3–1.4 percent by weight of a solute, the solute being composed of tellurium, and the remainder being zirconium.

38 Claims, No Drawings

CORROSION RESISTANT ZIRCONIUM ALLOYS

This application is a continuation, of application Ser. No. 041,507, filed Apr. 23, 1987 abandoned.

BACKGROUND OF THE INVENTION

1. Field of the Invention

The present invention relates to zirconium-based alloys suitable for use in nuclear reactor service, and more specifically for use in the cladding of fuel elements.

2. Description of Related Art

Zirconium-based alloys have long been used in the cladding of fuel elements in nuclear reactors. A desirable combination is found in zirconium by virtue of its low thermal neutron cross-section and its generally acceptable level of resistance to corrosion in a boiling water reactor environment. Zircaloy 2, a Zr—Sn—Ni—Fe—Cr alloy, has enjoyed widespread use and continues to be used at present in nuclear reactor applications. This alloy has provided adequate performance in reactor service, but also possesses some deficiencies which have prompted further research to find materials which would provide improved performance. Zircaloy 4 was one alloy developed as a result of that research. This allloy essentially eliminates the Ni (0.007% max. wt. percent) from a Zircaloy 2-type alloy. Zircaloy 4 was developed as an improvement to Zircaloy 2 to reduce problems with hydriding, which causes Zircaloy 2 to become brittle when cooled to ambient temperatures (e.g. when the reactor is shut down) after absorbing hydrogen at higher temperatures.

The Zircaloy alloys are among the best corrosion resistant materials when tested in water at reactor operating temperatures (approx. 290° C.) in the absence of the radiation from the nuclear fission reaction. The corrosion rate under those conditions is very low and the corrosion product is a uniform, tightly adherent, black $ZrO_2$ film/layer. In actual service, however, the Zircaloy is irradiated and is also exposed to radiolysis products present in reactor water. The corrosion resistance properties of Zircaloy deteriorate under these conditions and the corrosion rate thereof is accelerated.

Research efforts directed at improving the corrosion properties of the zirconium-based alloys have yielded some advances. Corrosion resistance has been enhanced in some instances through carefully controlled heat treatments of the alloys either prior to or subsequent to material fabrication. Added heat treatment cycles, however, generally increase the expense of making finished products, and in those instances where an installation requires welding to be performed, the area affected by the heat of the welding operation may not possess the same corrosion resistance characteristics as the remainder of the article. Variations in the alloying elements employed and the percentages of the alloying elements have also been propounded in an effort to address corrosion-resistance deterioration of these alloys.

The deterioration under actual reactor conditions of the corrosion resistance properties of Zircaloy is not manifested in merely an increased uniform rate of corrosion. Rather, in addition to the black $ZrO_2$ layer formed, a localized, or nodular corrosion phenomenon has been observed especially in boiling water reactors (BWR). In addition to producing an accelerated rate of corrosion, the corrosion product of the nodular corrosion reaction is a highly undesirable white $ZrO_2$ bloom which is less adherent and lower in density than the black $ZrO_2$ layer.

The increased rate of corrosion caused by the nodular corrosion reaction will be likely to shorten the service life of the tube cladding, and also this nodular corrosion will have a detrimental effect on the efficient operation of the reactor. The white $ZrO_2$, being less adherent, may be prone to spalling or flaking away from the tube into the reactor water. On the other hand, if the nodular corrosion product does not spall away, a decrease in heat transfer efficiency through the tube into the water is created when the nodular corrosion proliferates and the less dense white $ZrO_2$ covers all or a large portion of a tube.

Actual reactor conditions cannot be readily duplicated for normal laboratory research due to the impracticality of employing a radiation source to simulate the irradiation experienced in a reactor. Additionally, gaining data from actual use in reactor service is an extremely time consuming process. For this reason, there is no conclusory evidence in the prior art which explains the exact corrosion mechanism which produces the nodular corrosion. This limits, to some degree, the capability to ascertain whether other alloys will be susceptible to nodular corrosion before actually placing samples made from these alloys into reactors.

Laboratory tests conducted under the conditions normally experienced in a reactor (absent radiation) at approximately 300° C. and 1000 psig in water, will not produce a nodular corrosion product on Zircaloy alloys like that found on Zircaloy alloys which have been used in reactor service. However, if steam is used, with the temperature increased to over 500° C. and the pressure raised to 1500 psig, a nodular corrosion product like that found on Zircaloy in reactor service can be produced on zircaloy alloys in laboratory tests. Specimens of Zircaloy alloys which are annealed at 750° C. for 48 hours are particularly susceptible to nodular corrosion under these test conditions. These annealed Zircaloy specimens will produce, in tests run for relatively short times, i.e. 24 hours, a degree of nodular corrosion comparable to that of Zircaloy tube cladding in actual reactor service. At this higher temperature and pressure, a simulated nuclear reactor environment is provided which will allow researchers to determine the susceptibility of new alloys to nodular corrosion. Results of these tests can be generally compared to those of Zircaloy specimens tested under the same conditions.

Any new alloy which would be considered as a suitable alternate or replacement for the Zircaloy alloys must not only be less susceptible than the Zircaloy alloys to nodular corrosion, but must maintain acceptable uniform corrosion rates, comparable to those of the Zircaloy alloys, to ensure sufficient service life.

It is therefore a principal object of the present invention to provide a group of alloys having improved corrosion resistance characteristics in a nuclear reactor environment.

It is another important object of the present invention to provide a group of alloys which do not depend on carefully controlled heat treatment for their corrosion resistance properties.

SUMMARY OF THE INVENTION

The present invention relates to zirconium based alloys which consist essentially of about 0.5 to 2.0 weight percent tin, approximately 0.5–1.0 weight percent of a solute portion, and the balance zirconium.

Optionally the alloys may also contain approximately 0.09 to 0.16 weight percent of oxygen.

The solute portion in one preferred embodiment of the present invention is composed of a member selected from the group consisting of molybdenum, tellurium and mixtures thereof.

In another preferred embodiment, the solute is composed of niobium, the amount of niobium being less than about 0.5% by weight of the alloy, and a member selected from the group consisting of molybdenum, tellurium and mixtures thereof.

In another preferred embodiment, the solute is composed of niobium and tellurium.

In another preferred embodiment, the solute is composed of niobium, the amount of niobium being greater than about 0.5% by weight, molybdenum, and tellurium.

In other preferred embodiments, the amount of tin is in the range of about 0.65 to 1.60% by weight.

In other preferred embodiments, the amount of tin is about 1.5% by weight.

In other preferred embodiments, the amount of the solute is about 0.6% by weight.

In another preferred embodiment, the solute is composed of tellurium and the solute is in the range of about 0.3 to 1.4% by weight of the alloy.

In a further preferred embodiment the solute is composed of substantially 0.35% by weight of niobium and substantially 0.35% by weight of molybdenum.

In another preferred embodiment, the solute is composed of substantially 0.4% by weight of niobium and substantially 0.2% by weight of tellurium.

In another preferred embodiment, the solute is composed of substantially 0.4% by weight of molybdenum and substantially 0.2% by weight of tellurium.

In another preferred embodiment, the solute is composed of substantially 0.2% by weight of niobium, substantially 0.2% by weight of molybdenum, and substantially 0.2% by weight of tellurium.

In another preferred embodiment, the solute is composed of substatially 0.3% by weight of niobium, substantially 0.15% by weight of tellurium.

These alloys provide increased resistance to nodular corrosion in high pressure and temperature steam testing, while maintaining an acceptable uniform corrosion rate in water and steam tests.

DETAILED DESCRIPTION OF THE INVENTION

The alloys of the present invention have demonstrated adequate resistance to uniform corrosion to be considered for nuclear reactor service, and the corrosion resistance is generally comparable to the excellent uniform corrosion resistance possessed by the Zircaloy alloys. The alloys of the present invention also demonstrate improved resistance to nodular corrosion.

The addition of tin to zirconium has been practiced in the art prior to this invention, as evidenced by Zircaloy and other known zirconium-based alloys. The presence of Sn, which stabilizes the alpha-form of Zr, primarily contributes to the strength of the alloy, although there is some improvement in uniform corrosion resistance attributable to the Sn. It has been determined that concentration levels below about 0.5% by weight of Sn will yield an alloy in which the uniform corrosion rate in water is unacceptably high. Additionally, concentration levels in excess of about 2.0% by weight of Sn will yield an alloy which demonstrates an acceptable level of accelerated corrosion in laboratory steam tests. The alloys of the present invention have a Sn content within the range of from about 0.5% to about 2.0% by weight, preferably from about 0.65% to about 1.60% by weight, and most preferably contain about 1.5% by weight of Sn. The alloys of the present invention further contain certain additional alloying elements, termed collectively herein as a solute portion of the alloy. The solute portion of the alloys of the present invention differs from the additional alloying elements found in the Zircaloy alloys, and is primarily responsible for the comparative increase in resistance to nodular corrosion. Conventional impurities will also be present in these alloys.

It should be noted that the alloys of the present invention will also optionally contain from about 0,09 to 0.16 weight percent of oxygen. Most commercial grade sponge zirconium which would be used in making alloys such as the ones in the present invention will contain small amounts of oxygen, roughly on the order of about 800-1300 parts per million. In some instances, it will be desirable to increase the concentration of oxygen in the alloy. Adding oxygen is one way to increase room temperature yield strength. Thus, the alloys of the present invention may be produced with or without the additional oxygen, as this will have little or no effect on the corrosion resistance of the alloys. There are several parameters which should be considered in choosing alloying elements for the candidate Zr-based alloys to be used for fuel cladding in boiling water reactor service. The thermal neutron cross-section of the element should be relatively low to permit products of the fission reaction to easily pass through the fuel cladding, thereby allowing the boiling water reactor to operate as efficiently as possible. The cost of the material should be taken into account, and must not be prohibitively high. The ease or difficulty with which an alloy containing the element or elements and zirconium can be produced must also be considered. It is further desired that the element or elements will enhance the corrosion resistance properties of the zirconium under actual or simulated boiling water reactor conditions.

The thermal neutron cross-section of an element is generally a known property of the element if it has ever come under consideration for use in a nuclear reactor. The costs of the materials can be ascertained from historic price data, with extrapolation if required. The alloying process of the alloys of the present invention is similar to conventional methods for alloying zirconium and thus ease of alloying is fairly predictable. The alloying is accomplished preferably by arc melting a zirconium billet having a suitable amount of the alloying metals encased in a hollow portion of the billet. This molten metal is then cast as an alloy billet, which will then be subjected to finishing processes to produce final shapes.

Generally, the most difficult of these parameters to predict is whether the alloying element will contribute to the enhancement of corrosion resistance.

In the present invention, it has been discovered that zirconium-based alloys having approximately 0.5-2.0% by weight tin, and solute portions containing niobium, tellurium, molybdenum, and mixtures thereof, the solute portion being present in concentrations ranging from about 0.3 and 1.4 weight percent of the alloy, perform substantially better than Zircaloy 2 in tests conducted to determine resistance to nodular corrosion. These alloys also perform well in tests for determining resistance to uniform corrosion. In addition to enhancing nodular corrosion resistance, these elements, niobium, tellurium and molybdenum, also possess the other desired features previously mentioned.

Tests for both uniform corrosion resistance and nodular corrosion resistance have been conducted on alloys of the present invention. These tests have shown that a dramatic decrease in susceptibility to nodular corrosion can be attained in an alloy which is relatively insensitive to heat treatment while retaining essentially the same uniform corrosion resistance of a Zircaloy 2 alloy.

The alloying elements which make up the solute portion appear to be most effective in these alloys at a total solute concentration of about 0.6–0.7 weight percent of the alloy. Solute concentrations ranging from as low as 0.3 weight percent to as high as 1.4 weight percent have been tested and have been shown to exhibit superior resistance to nodular corrosion, compared to the performance of Zircaloy 2.

The majority of the alloys tested have total solute concentrations in the range of 0.5 to 1.0 weight percent. Alloys having tellurium as the sole element making up the solute have also been tested, with excellent results, the concentrations ranging between 0.3% by weight and 1.4% by weight.

Table 1 lists several examples of alloys of the present invention, along with three entries at the bottom of the table which are Zircaloy 2 alloys in three different heat-treatment states. These alloys were tested in water containing 8 ppm oxygen, at 288° C. and 1500 psig, conditions similar to a reactor operating temperature and pressure (minus a radiation source), to evaluate the resistance to uniform corrosion.

It can be seen from the results in this table that the tested alloys of the present invention exhibit excellent resistance to uniform corrosion, the corrosion rates in most cases being comparable to those of the Zircaloy 2 specimens. None of the specimens tested under these conditions exhibit any sign of the formation of nodular corrosion products.

Table 2 reports the results of tests conducted to determine the susceptibility of the alloys of the present invention to nodular corrosion. The test conditions used (steam at 510° C., 1500 psig) were those which induce, in the laboratory, the formation of the nodular corrosion product on Zircaloy alloys (with 750° C./48 hr. anneal) identical to that found on Zircaloy after being used in reactor service. For purposes of comparison, the weight gains of the annealed Zircaloy (not tabulated herein) under these same test conditions are on the order of several thousand miligrams per square decimeter.

The alloys of the present invention were tested in various heat-treatment states. The results in Table 2 also provide an indication that the corrosion-resistance properties of these alloys are relatively insensitive to the heattreatment state of the specimen. Some compositions were tested using specimens in cold-rolled plate form, both with and without a subsequent anneal. Others were tested in the "as-cast" form, both with and without subsequent annealing. Several compositions were tested only after having been annealed. The 750° C. anneal for 48 hours, which all of the tested alloys of the present invention were subjected to, is the heat treatment which strips the Zircaloy 2 alloy of its resistance to nodular corrosion under the laboratory steam tests.

All of the weight gains reported in Table 2 are far superior to the results obtained when sensitized (annealed) Zircaloy alloy is tested. Most of the alloys of the present invention produced weight gains of less than 100 mg/dm$^2$, while the remainder produced weight gains on the order of one or two hundred milligrams per square decimeter. As previously mentioned, weight gains reported in tests of sensitized Zircaloy specimens under the same test times and conditions are on the order of several thousand milligrams per square decimeter.

It should be noted that the alloy tested which contains 1.4% by weight of tellurium did not contain tin, which is an element recited as being present in the range of 0.5–2.0 weight percent in the alloys of the present invention. The presence of tin will have little effect on the resistance to nodular corrosion, in the 0.5–2.0 weight percent range of the alloys of the present invention. Therefore, an alloy similar to the one tested, and having 1.4 weight percent tellurium, further having 0.5–2.0 weight percent tin, with the remainder being zirconium, would provide the same or very similar performance to the Zr-1.4Te alloy listed in Tables 1 and 2.

In addition to the reduced weight gains evidenced in the alloys of the present invention, none of these alloys showed any sign of formation of nodular corrosion products. Under the test conditions, these alloys clearly provide improvement in resistance to nodular corrosion.

TABLE 1

OXIDE GROWTH/WEIGHT GAIN
IN WATER AT 288° C., 1500 psig, 8 ppm OXYGEN

| Alloy Composition[a] | Weight Gain (mg/dm$^2$) | |
|---|---|---|
|  | 1000 hrs. | 1700 hrs. |
| Zr—1.51Sn—0.38Nb—0.19Mo | 13.8 | 14.0 |
| Zr—1.56Sn—0.38Te—0.21Nb | 9.5 | 10.3 |
| Zr—1.53Sn—0.22Te—0.39Nb | 11.3 | 12.0 |
| Zr—1.57Sn—0.16Te—0.26Nb—0.15Mo | 13.3 | 10.8 |
| Zr—1.55Sn—0.2Te—0.2Nb—0.18Mo | 11.7 | 12.5 |
| Zr—1.60Sn—0.58Te | 9.7 | 11.5 |
| Zr—1.16Sn—0.72Te | 9.8 | 11.0 |
| Zr—1.13Sn—0.60Te | 10.5 | 12.5 |
| Zr—1.65Sn—0.68Te | 10.0 | 12.0 |
| Zr—1.54Sn—0.69Te | 12.5 | 20.8 |
| Zr—1.50Sn—0.29Nb—0.28Mo | 15.3 | 19.0 |
| Zr—1.50Sn—0.5Mo | 13.5 | 16.8 |
| Zr—1.5Sn—0.2Nb—0.4Mo | 11.0 | 13.6 |
| Zr—1.5Sn—0.2Nb—0.4Mo | 21.8 | 50.0 |
| Zr—1.5Sn—0.4Nb—0.2Mo | 21.2 | 40.0 |
| Zr—1.5Sn—0.5Nb—0.5Mo | 16.8 | 33.0 |
| Zr—1.4Te | 18.0 | 33.8 |
| Zr—1.3Sn—0.6Te | 4.3 | [b] |
| Z2 (Zircaloy 2, cross-rolled commercial plate) | 11.0 | 13.2 |
| Z2 w/750° C./16 hr. anneal | 11.0 | 15.0 |
| Z2 w/Beta quench | 15.0 | 17.0 |

[a]Compositions are in weight percent.
[b]Test not completed.

TABLE 2

WEIGHT GAIN AFTER EXPOSURE TO STEAM AT 510° C., 1500 psig FOR 24 HOURS

| Alloy Composition[1] | Weight Gain (mg/dm$^2$) Cold Rolled 0.1" Plate | | As Cast | |
|---|---|---|---|---|
| | 0.1" Plate No HT[2] | 2/750° C./48 hr. Anneal | No HT[2] | W/750°/48 hr. Anneal |
| Zr—1.51Sn—0.38Nb—0.19Mo | 44 | 61 | * | * |
| Zr—1.56Sn—0.38Te—0.21Nb | 69 | 58 | * | * |
| Zr—1.53Sn—0.22Te—0.39Nb | 47 | 49 | * | * |
| Zr—1.57Sn—0.16Te—0.26Nb—0.15Mo | 48 | 58 | * | * |
| Zr—1.55Sn—0.2Te—0.2Nb—0.18Mo | 60 | 64 | * | * |
| Zr—1.60Sn—0.58Te | 111 | 107 | * | * |
| Zr—1.16Sn—0.72Te | 94 | 88 | * | * |
| Zr—1.13Sn—0.60Te | 88 | 90 | * | * |
| Zr—1.65Sn—0.68Te | 99 | 95 | * | * |
| Zr—1.54Sn—0.69Te | * | 83 | * | * |
| Zr—1.50Sn—0.29Nb—0.28Mo | * | 70 | * | * |
| Zr—1.50Sn—0.5Mo | * | 68 | * | * |
| Zr—1.49Sn—0.34Nb—0.32Mo | 42/43 | 61/57 | * | * |
| Zr—1.5Sn—0.5Nb—0.5Mo | 52 | 70 | * | * |
| Zr—1.0Sn—0.5Nb—0.5Mo | 85 | 70 | * | * |
| Zr—1.5Sn—0.5Nb—0.5Mo | 70 | 68 | * | * |
| Zr—1.5Sn—0.3Te—0.15Nb—0.15Mo | 65 | 67 | * | * |
| Zr—1.5Sn—0.3Mo—0.15Te—0.15—Nb | 65 | 63 | * | * |
| Zr—1.0Sn—0.3Te | * | * | 214 | 117 |
| Zr—1.5Sn—0.30Te | * | * | 260 | 107 |
| Zr—0.5Sn—0.50Te | * | * | 144 | 88 |
| Zr—1.3Sn—0.6Te | 45 | 42 | * | * |
| Zr—1.5Sn—1.00Te | * | * | 100 | 156 |
| Zr—1.4Te | * | * | * | 74 |
| Zr—2.0Sn—0.30Nb—0.30Mo | * | * | * | 102 |
| Zr—0.5Sn—0.50Nb—0.50Mo | * | * | * | 62 |
| Zr—1.0Sn—0.50Nb—0.50Mo | * | * | * | 79 |
| Zr—1.5Sn—0.50Nb—0.50Mo | * | * | * | 108 |

[1]Compositions are in weight percent.
[2]No HT — No subsequent heat treatment.
*Not tested While other modifications of this invention and variations thereof which may be employed within the scope of the invention have not been described, the invention is intended to include such that may be embraced with the following claims.

What is claimed is:

1. A corrosion resistant alloy consisting essentially of 0.5 to 2.0% by weight of tin, 0.5 to 1.0% by weight of a solute composed of molybdenum and tellurium, and the balance zirconium.

2. A corrosion resistant alloy according to claim 1 wherein said solute is substantially 0.6% by weight.

3. A corrosion resistant alloy according to claim 2 wherein the amount of tin is in the range of 0.65-1.60% by weight.

4. A corrosion resistant alloy according to claim 3 wherein the amount of tin is 1.5% by weight.

5. A corrosion resistant alloy according to claim 1 wherein the amount of tin is in the range of 0.65-1.60% by weight.

6. A corrosion resistant alloy according to claim 5 wherein the amount of tin is 1.5% by weight.

7. A corrosion resistant alloy according to claim 1, further consisting essentially of 0.09 to 0.16% by weight of oxygen.

8. A corrosion resistant alloy according to claim 2 wherein said solute is composed of a mixture of molybdenum and tellurium, the amount of molybdenum being substantially 0.4% by weight, and the amount of tellurium being substantially 0.2% by weight.

9. A corrosion resistant alloy consisting essentially of 0.5 to 2.0% by weight of tin, 0.5 to 1.0% by weight of solute, said solute consisting of niobium, the amount of niobium being less than 0.5% by weight of the alloy, and a member selected from the group consisting of molybdenum, tellurium, and mixtures thereof, and the balance zirconium.

10. A corrosion resistant alloy according to claim 9 wherein said solute is substantially 0.6% by weight.

11. A corrosion resistant alloy according to claim 10 wherein the amount of tin is in the range of 0.65-1.60% by weight.

12. A corrosion resistant alloy according to claim 11 wherein the amount of tin is 1.5% by weight.

13. A corrosion resistant alloy according to claim 10 wherein the solute consists of niobium and molybdenum, the amount of niobium being substantially 0.4% by weight and the amount of molybdenum being substantially 0.2% by weight.

14. A corrosion resistant alloy according to claim 10 wherein said solute is composed of substantially 0.2% by weight of niobium, substantially 0.2% by weight of molybdenum, and subtantially 0.2% by weight of tellurium.

15. A corrosion resistant alloy according to claim 10 wherein said solute is composed of substantially 0.3% by weight of niobium, substantially 0.15% by weight of molybdenum, and substantially 0.15% by weight of tellurium.

16. A corrosion resistant alloy according to claim 9 wherein the amount of tin is in the range of 0.65-1.60% by weight.

17. A corrosion resistant alloy according to claim 16 wherein the amount of tin is 1.5% by weight.

18. A corrosion resistant alloy according to claim 9, further consisting essentially of 0.09 to 0.16% by weight of oxygen.

19. A corrosion resistant alloy according to claim 9 wherein the solute consists of niobium and molybdenum, the amount of niobium being substantially 0.35% by weight and the amount of molybdenum being substantially 0.35% by weight.

20. A corrosion resistant alloy consisting essentially of 0.5 to 2.0% by weight of tin, 0.5-1.0% by weight of solute composed of niobium and tellurium, and the balance zirconium.

21. A corrosion resistant alloy according to claim 20 wherein said solute is substantially 0.6% by weight.

22. A corrosion resistant alloy according to claim 21 wherein the amount of tin is in the range of 0.65-1.60% by weight.

23. A corrosion resistant alloy according to claim 22 wherein the amount of tin is 1.5% by weight.

24. A corrosion resistant alloy according to claim 21 wherein the amount of niobium is substantially 0.4% by weight and the amount of tellurium is substantially 0.2% by weight.

25. A corrosion resistant alloy according to claim 20 wherein the amount of tin is in the range of 0.65-1.60% by weight.

26. A corrosion resistant alloy according to claim 25 wherein the amount of tin is 1.5% by weight.

27. A corrosion resistant alloy according to claim 20, further consisting essentially of 0.09 to 0.16% by weight of oxygen.

28. A corrosion resistant alloy consisting essentially of 0.5 to 2.0% by weight of tin, 0.6 to 1.0% by weight of solute, said solute being composed of niobium, molybdenum, and tellurium, the amount of niobium being at least 0.5% by weight, and the balance zirconium.

29. A corrosion resistant alloy according to claim 28 wherein said solute is substantially 0.6% by weight.

30. A corrosion resistant alloy according to claim 29 wherein the amount of tin is in the range of 0.65-1.60% by weight.

31. A corrosion resistant alloy according to claim 30 wherein the amount of tin is 1.5% by weight.

32. A corrosion resistant alloy according to claim 28 wherein the amount of tin is in the range of 0.65-1.60% by weight.

33. A corrosion resistant alloy according to claim 32 wherein the amount of tin is 1.5% by weight.

34. A corrosion resistant alloy according to claim 28, further consisting essentially of 0.09 to 0.16% by weight of oxygen.

35. A corrosion resistant alloy consisting essentially of 0.5 to 2.0% by weight of tin, 0.3 to 1.4% by weight of solute composed of tellurium, and the remainder zirconium.

36. A corrosion resistant alloy according to claim 35 wherein the amount of tin is in the range of 0.65-1.60% by weight.

37. A corrosion resistant alloy according to claim 36 wherein said solute is in the range of 0.3-1.0% by weight.

38. A corrosion resistant alloy according to claim 35, further consisting essentially of 0.09 to 0.16% by weight of oxygen.

* * * * *